(12) United States Patent
Mehrandezh et al.

(10) Patent No.: US 9,056,746 B2
(45) Date of Patent: Jun. 16, 2015

(54) ADAPTABLE VEHICLE

(75) Inventors: Mehran Mehrandezh, Regina (CA); Amir Hossein Bazargan, Regina (CA)

(73) Assignee: University of Regina, Regina (CA)

( * ) Notice: Subject to any disclaimer, the term of this patent is extended or adjusted under 35 U.S.C. 154(b) by 0 days.

(21) Appl. No.: 13/982,769

(22) PCT Filed: Feb. 10, 2012

(86) PCT No.: PCT/CA2012/000118
§ 371 (c)(1),
(2), (4) Date: Aug. 27, 2013

(87) PCT Pub. No.: WO2012/106809
PCT Pub. Date: Aug. 16, 2012

(65) Prior Publication Data
US 2013/0328290 A1 Dec. 12, 2013

Related U.S. Application Data

(60) Provisional application No. 61/441,812, filed on Feb. 11, 2011.

(51) Int. Cl.
*B60B 11/02* (2006.01)
*B66B 9/02* (2006.01)
(Continued)

(52) U.S. Cl.
CPC .............. *B66B 9/02* (2013.01); *B62D 57/028* (2013.01); *B62D 61/00* (2013.01); *B60B 11/02* (2013.01); *B60B 19/12* (2013.01); *F16L 55/32* (2013.01); *B60K 7/0007* (2013.01);
(Continued)

(58) Field of Classification Search
CPC ......... F16L 55/32; B60B 11/02; B60B 19/12; B60K 2007/0092; B60Y 2200/44; B60Y 2200/60; B62D 57/028; B66B 9/02

USPC ............ 180/8.2, 9.32, 21, 6.2, 6.5, 208, 209, 180/210, 65.51, 8.3, 7.1; 280/5.2, 5.28, 280/5.32; 901/1; 700/245
See application file for complete search history.

(56) References Cited

U.S. PATENT DOCUMENTS 5,515,934 A * 5/1996 Davis .............................. 180/8.2
6,112,843 A * 9/2000 Wilcox et al. .................. 180/345
(Continued)

OTHER PUBLICATIONS

Xu et al., "A Wheel-Based Cable Climbing Robot with Descending Speed Restriction", Chinese Control and Decision Conference, pp. 1570-1575, Jul. 2008.
(Continued)

*Primary Examiner* — J. Allen Shriver, II
*Assistant Examiner* — Emma K Frick
(74) *Attorney, Agent, or Firm* — Bereskin & Par LLP/S.E.N.C.R.L., s.r.l.

(57) ABSTRACT

The present disclosure is directed at an adaptable vehicle that includes a pair of primary rollers for rolling along a surface on which the vehicle is travelling. At least one of the rollers is rotatably powered. The adaptable vehicle also includes two sets of linking arms, one of which is coupled to one of the rollers and the other of which is coupled to the other of the rollers such that moving the sets of linking arms can shift the axes of rotation of the rollers without impeding rotation of the rollers. The sets of linking arms are connected to and rotatable about an actuatable hub. Actuation of the hub causes at least one set of the linking arms to rotate about the hub and shifts the axis of rotation of at least one of the rollers to allow the vehicle to adapt to its surroundings.

11 Claims, 14 Drawing Sheets

(51) Int. Cl.

| | | |
|---|---|---|
| *B62D 57/028* | (2006.01) | |
| *B62D 61/00* | (2006.01) | |
| *B60B 19/12* | (2006.01) | |
| *F16L 55/32* | (2006.01) | |
| *B60K 7/00* | (2006.01) | |
| *B60K 17/356* | (2006.01) | |

(52) U.S. Cl.
CPC ........ *B60K 17/356* (2013.01); *B60K 2007/003* (2013.01); *B60K 2007/0092* (2013.01); *B60Y 2200/44* (2013.01); *B60Y 2200/60* (2013.01)

(56) References Cited

U.S. PATENT DOCUMENTS

| | | | | |
|---|---|---|---|---|
| 6,571,892 | B2* | 6/2003 | Kamen et al. | 180/8.2 |
| 6,662,889 | B2* | 12/2003 | De Fazio et al. | 180/22 |
| 7,348,747 | B1* | 3/2008 | Theobold et al. | 318/568.21 |
| 7,845,440 | B2* | 12/2010 | Jacobsen | 180/9.46 |
| 8,185,241 | B2* | 5/2012 | Jacobsen | 700/250 |
| 8,205,695 | B2* | 6/2012 | Jacobsen et al. | 180/9.1 |
| 8,316,972 | B2* | 11/2012 | Hutcheson et al. | 180/65.1 |
| 8,347,445 | B2* | 1/2013 | Park | 15/104.09 |
| 8,393,422 | B1* | 3/2013 | Pensel | 180/9.46 |
| 8,571,711 | B2* | 10/2013 | Jacobsen et al. | 700/247 |
| 2004/0099175 | A1* | 5/2004 | Perrot et al. | 104/138.1 |
| 2008/0164079 | A1* | 7/2008 | Jacobsen | 180/7.1 |
| 2010/0318242 | A1* | 12/2010 | Jacobsen et al. | 701/2 |
| 2014/0146161 | A1* | 5/2014 | Sibai | 348/84 |

OTHER PUBLICATIONS

Quan et al., "A Modular Crawler-driven Robot: Mechanical Design and Preliminary Experiments", IEEE/RSJ International Conference on Intelligent Robots and Systems, pp. 639-644, Oct. 2009.

M'Closkey et al., "On the Periodic Motions of Simple Hopping Robots", IEEE International Conference on Systems, Man and Cybernetics, pp. 771-777, Nov. 1990.

Foo et al., "Starcly Robot—A Novel Compact Stair Climbing Robot", 2nd ICMEE International Conference, vol. 2, pp. 75-78, Aug. 1990.

Hewapathirana, et al., "Analysis on Four Legged Multipurpose Rope Climbing Robot", ICIIS International Conference on Industrial and Information Systems, pp. 505-510, Dec. 2009.

Yan et al., "Development & Application of Wall-Climbing Robots", IEEE International Conference on Robotics and Automation, vol. 2, pp. 1207-1212, May 1999.

Briones et al., "Wall-Climbing Robot for Inspection in Nuclear Power Plants", IEEE International Conference on Robotics and Automation, vol. 2, pp. 1409-1414, May 1994.

La Rosa et al., "A low-cost lightweight climbing robot for the inspection of vertical surfaces", Mechatronics, vol. 12, Issue 1, pp. 71-96, Feb. 2002.

Wang et al., "Design and Implementation of a Stair-Climbing Robot", IEEE Workshop on Advanced Robotics and its Social Impacts, pp. 1-6, Aug. 2008.

Kim et al., "Smooth Vertical Surface Climbing with Directional Adhesion", IEEE Transactions on Robotics, vol. 24, No. 1, pp. 65-74, Feb. 2008.

Krishna et al., "Tethering System Design for Dante II", IEEE International Conference on Robotic and Automation, vol. 2, pp. 1100-1105, Apr. 1997.

Baghani et al., "Kinematics Modeling of a Wheel-Based Pole Climbing Robot (UT-PCR)", IEEE International Conference on Robotics and Automation, pp. 2099-2104, Apr. 2005.

Vastianos, "Sloth Rope Climbing Robot", http://seattlerobotics.org/encoder/100210/prj5/sloth.htm.

Okada, "A Three-Wheeled Self-Adjusting Vehicle in a Pipe", The International Journal of Robotics Research, vol. 6, No. 4, pp. 60-75, Winter 1987.

Eckert et al., "Pipe Penetration Inspection and Repair Equipment", Annual Meeting of American Nuclear Society, Reno, Nevada, Jun. 15-19, 1986.

Madhani, "Motion Planning of Mobile Multi-Limb Robotic Systems Subject to Force and Friction Constraints", IEEE Robotics and Automation, pp. 133-139, Nice, France, May 1992.

Neubauer, "A Spider-Like Robot that Climbs Vertically in Ducts or Pipes", IEEE/RSJ/GI International Conference, vol. 2, pp. 1178-1185, Sep. 1994.

Yazdani, "Design and Development of a Pole Climbing Robot Mechanism", In the proceedings of mechatronics and robotics, Germany, Sep. 2004.

* cited by examiner

ADAPTABLE VEHICLE

This application is a National Stage of co-pending International Application No. PCT/CA2012/000118 filed Feb. 10, 2012, which claims the benefit of priority of U.S. Provisional Patent Application No. 61/441,812 filed Feb. 11, 2011, the contents of both of which are herein incorporated in their entirety by reference.

TECHNICAL FIELD

The present disclosure is directed at an adaptable vehicle. More particularly, the present disclosure is directed at an adaptable vehicle that is able to climb objects such as pipes and ducts.

BACKGROUND

Automation benefits society in several ways. For example, automating tasks by using a machine instead of a person to perform the tasks can reduce the likelihood that a person will be injured while performing the tasks, and can increase productivity by performing the tasks faster than a person could. Accordingly, there exists ongoing research regarding creating more robust, functional, and versatile machines.

BRIEF DESCRIPTION OF THE DRAWINGS

In the accompanying drawings, which illustrate one or more exemplary embodiments.

SUMMARY

Figure 1:
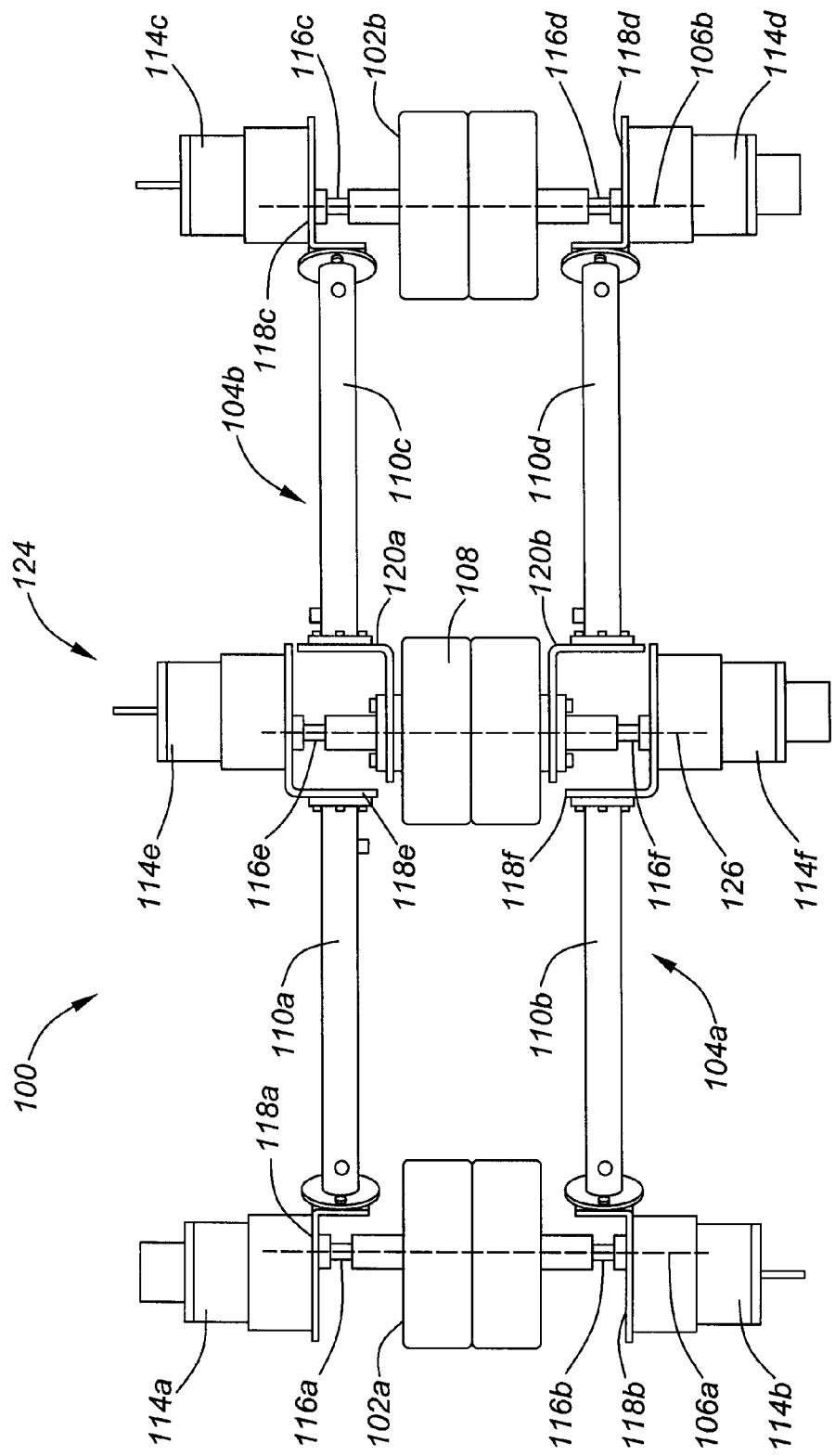
FIG. 1 is a top plan view of an adaptable vehicle, according to a first embodiment.
Figure 2:
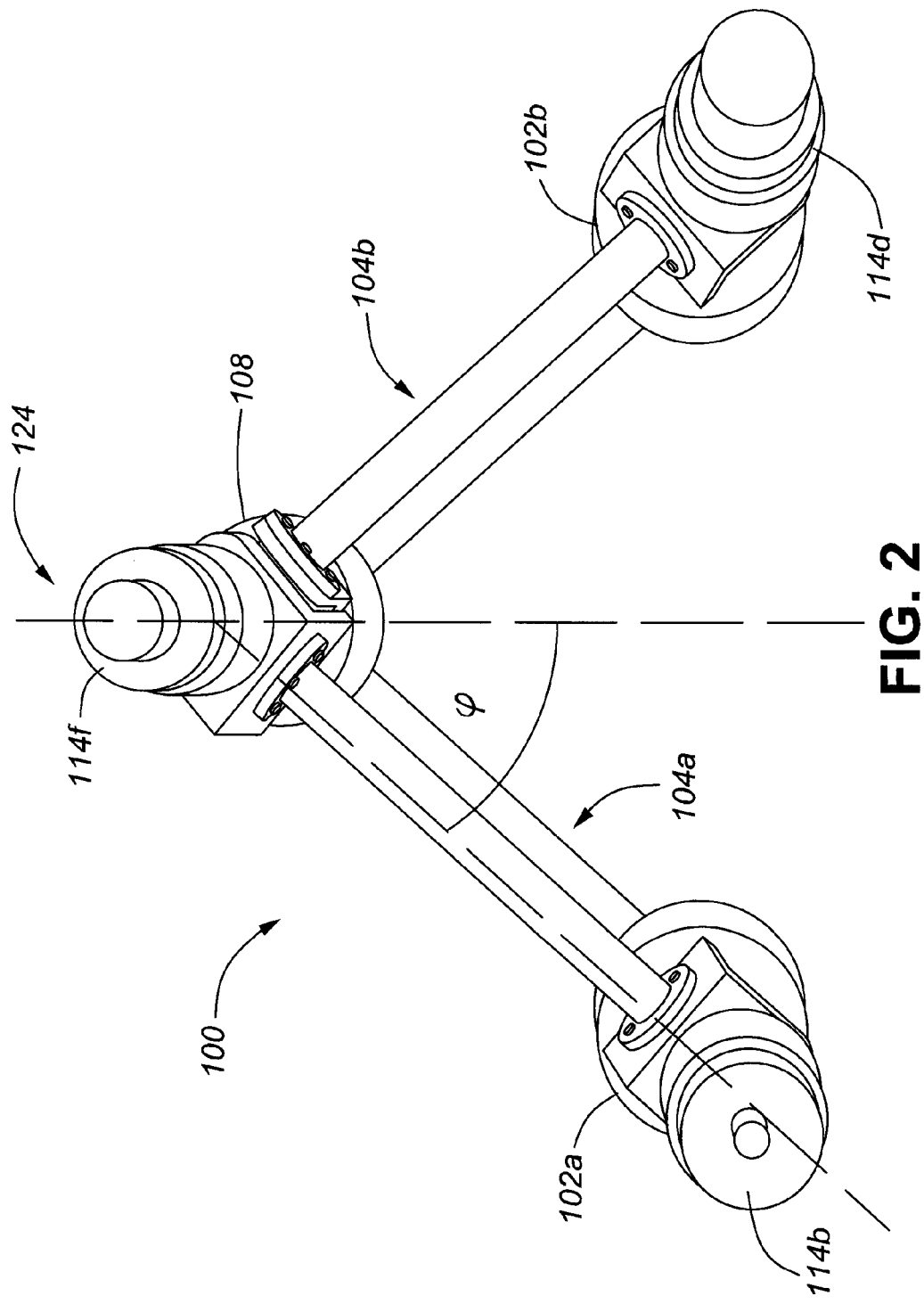
FIG. 2 is a side elevation view of the adaptable vehicle of FIG. 1.
Figure 3:
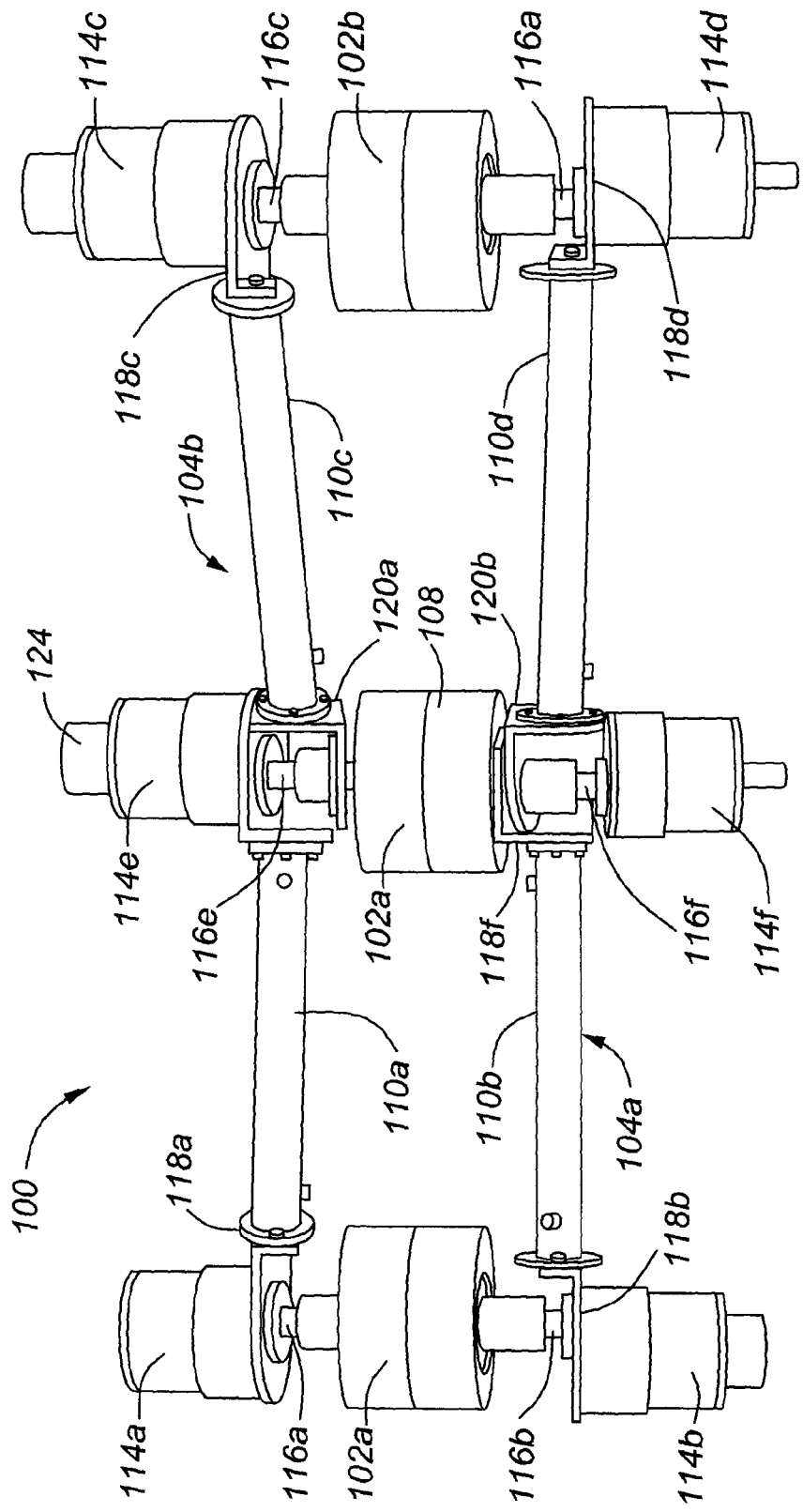
FIG. 3 is a bottom plan view of the adaptable vehicle of FIG. 1.
Figure 4:
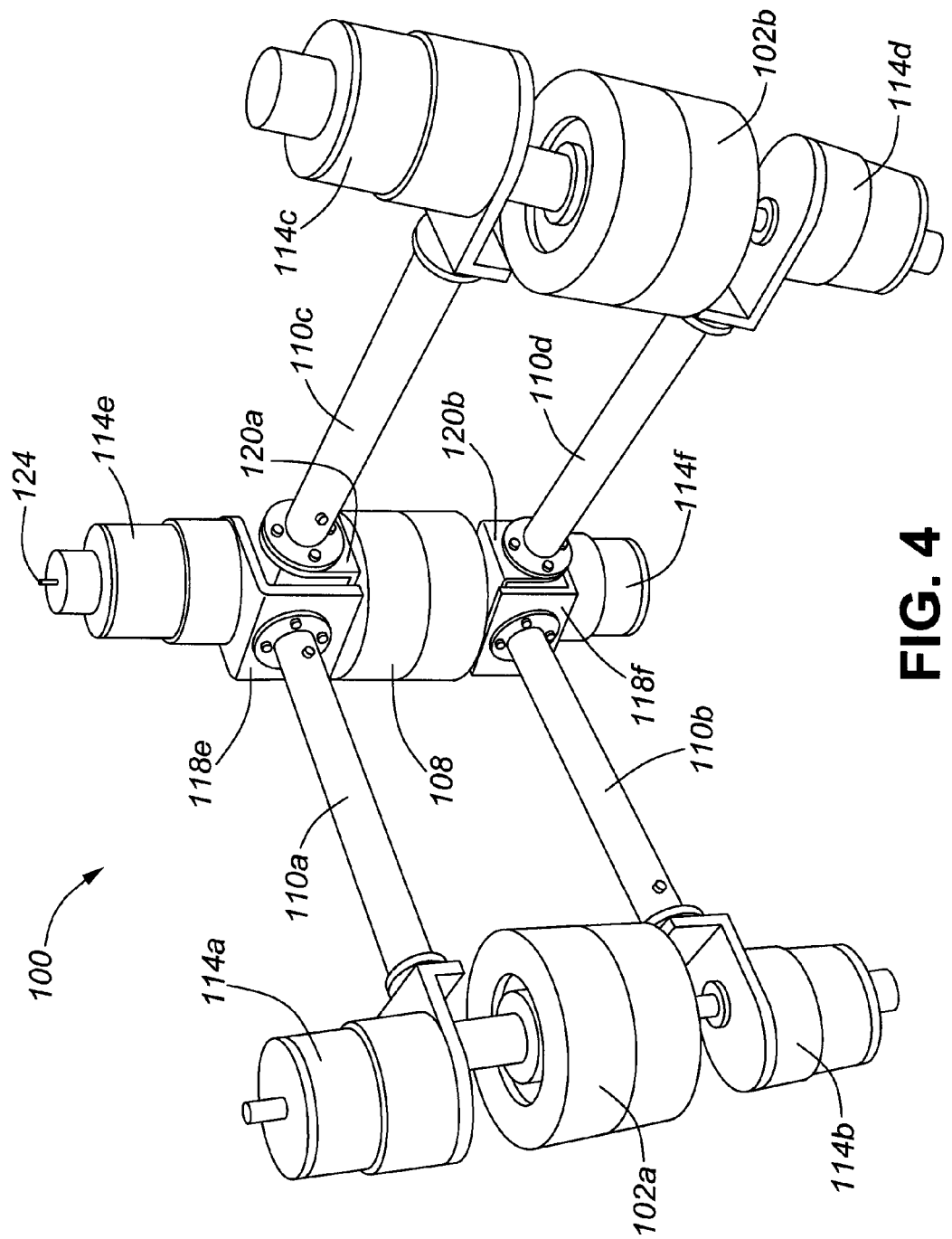
FIG. 4 is a perspective view of the adaptable vehicle of FIG. 1.

According to a first aspect, there is provided an adaptable vehicle. The adaptable vehicle includes a pair of a pair of primary rollers for rolling along a surface on which the vehicle is travelling; at least one of the rollers is rotatably powered. The adaptable vehicle also includes two sets of linking arms, one of which is coupled to one of the rollers and the other of which is coupled to the other of the rollers such that moving the sets of linking arms can shift the axes of rotation of the rollers without impeding rotation of the rollers. The adaptable vehicle also includes an actuatable hub to which the sets of linking arms connect and about which the sets of linking arms are rotatable. Actuation of the hub causes at least one set of the linking arms to rotate about the hub and shifts the axis of rotation of at least one of the rollers to allow the vehicle to adapt to its surroundings.

The hub roller may also be positioned to roll along the surface when the surface is of an object located between the primary rollers and the hub roller.

Each of the sets of linking arms may include a pair of linking arms between which the object passes as the vehicle is travelling. The primary and hub rollers may be coplanar along a roller plane that passes between the pairs of linking arms and that intersects the object.

The hub roller and the sets of linking arms may rotate about a common axis of rotation.

The hub roller may be unpowered. Both of the primary rollers may be rotatably powered.

Rotation of the sets of linking arms about the hub and of any of the rollers that are powered may be driven by a DC motor having an output shaft coaxial with the axis about which the rotation occurs.

The adaptable vehicle may also include a roller optical encoder positioned to measure the angular position of one of the primary rollers, and the hub may also include a hub optical encoder positioned to measure the angular position of the sets of linking arms.

According to another aspect, there is provided an adaptable vehicle for climbing an object. The adaptable vehicle includes a pair of primary rollers positioned to roll along a surface of one portion of the object. At least one of the rollers is rotatably powered. The adaptable vehicle also includes an actuatable hub having a hub roller positioned to roll along a surface of another portion of the object. The hub is actuatable in expanding and contracting directions. Two sets of linking arms each rotatably couple one of the primary rollers to the hub such that actuation of the hub in the expanding direction causes the primary and hub rollers to press against the object when the object is around the vehicle, and actuation of the hub in the contracting direction causes the primary and hub rollers to clamp the object when the object is located between the primary and hub rollers.

Each of the sets of linking arms may include a pair of linking arms between which the object passes as the vehicle is climbing when the object is located between the primary and hub rollers. The primary and hub rollers may be coplanar along a roller plane that passes between the pairs of linking arms and that intersects the object.

The hub rollers and the sets of linking arms may rotate about a common axis of rotation.

The hub roller may be unpowered. Both of the primary rollers may be rotatably powered.

The rotation of the sets of linking arms about the hub and of any of the rollers that are powered may be driven by a DC motor having an output shaft coaxial with the axis about which the rotation occurs.

The adaptable vehicle may also include a roller optical encoder positioned to measure the angular position of one of the primary rollers, and the hub may also include a hub optical encoder positioned to measure the angular position of the sets of linking arms.

According to another aspect, there is provided a method for climbing an object using an adaptable vehicle for climbing the object. The method includes actuating the hub such that frictional force between the primary and hub rollers press and the object is within a predetermined range sufficient to prevent the vehicle from falling, and powering the primary roller that is rotatably powered to propel the vehicle along the object.

The method may also include detecting a change in the shape of the object and accordingly actuating the hub such that the frictional force between the primary and hub rollers and the object is maintained within a predetermined range sufficient to prevent the vehicle from falling.

The method may also include detecting when the vehicle falls and, when the vehicle falls, actuating the hub such that sufficient frictional force results between the primary and hub rollers and the object to stop the vehicle from falling and locking the primary rollers in place.

According to another aspect, there is provided a computer readable medium having encoded thereon statements and instructions to cause a controller to control an adaptable vehicle according to any of the foregoing methods.

This summary does not necessarily describe the entire scope of all aspects. Other aspects, features and advantages will be apparent to those of ordinary skill in the art upon review of the following description of specific embodiments.

DETAILED DESCRIPTION

Directional terms such as "top", "bottom", "upwards", "downwards", "vertically" and "laterally" are used in the following description for the purpose of providing relative reference only, and are not intended to suggest any limitations on how any apparatus is to be positioned during use, or to be mounted in an assembly or relative to an environment.

One particular type of machine that can be used to automate tasks is a "vehicle", which refers to a machine, such as a robot, that can move from one place to another. Unsurprisingly, several types of vehicles are known in the art. These include, for example, highly configurable robots that are built to imitate the human body; high degree-of-freedom reconfigurable machines designed to resemble, for example, a snake; and simple and easy to control wheeled machines that prioritize simplicity at the cost of flexibility and adaptability. Research and development continues concerning vehicles that are robust, adaptable in that they can respond to changes in their surroundings during use, and simple to use and construct.

The following embodiments are directed at a vehicle that can adapt to changes in its surroundings while remaining relatively straightforward to construct and use. In certain embodiments the vehicle can be used to climb objects such as, for example, poles, stairs, and the interior of ducts.

Figure 10:
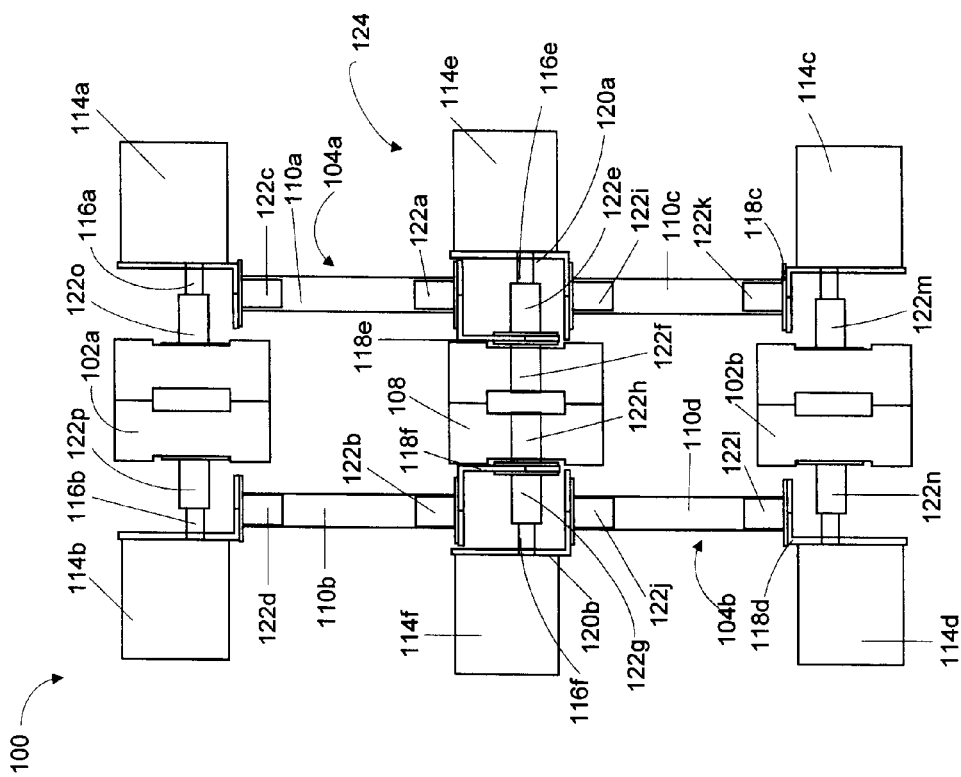
FIG. 10 is a schematic view of the adaptable vehicle of FIG. 1.

FIGS. 1 through 4 and 10 are different views of an adaptable vehicle 100, according to one exemplary embodiment. FIGS. 1 through 4 are, respectively, top plan, side elevation, bottom plan, and perspective views of the adaptable vehicle 100, while FIG. 10 is a schematic view emphasizing the components used to construct the adaptable vehicle 100. The adaptable vehicle 100 has an actuatable hub 124 to which are connected two sets of linking arms 104a,b. In the present embodiment, one of the sets of linking arms 104a includes a pair of linking arms 110a,b, while the other of the sets of linking arms 104b includes another pair of linking arms 110c,d.

The sets of linking arms 104a,b extend from the hub 124 and each is coupled to a primary roller 102a,b: one of the sets of linking arms 104a is coupled to one of the primary rollers 102a and the other of the sets of linking arms 104b is coupled to the other of the primary rollers 102b. As discussed in greater detail below, the sets of linking arms 104a,b can be actuated about the hub 124 so as to change the angle ($\phi$, as labelled in FIG. 2) between the hub 124 and the primary rollers 102a,b, which helps the adaptable vehicle 100 adapt to its surroundings.

Figure 5:
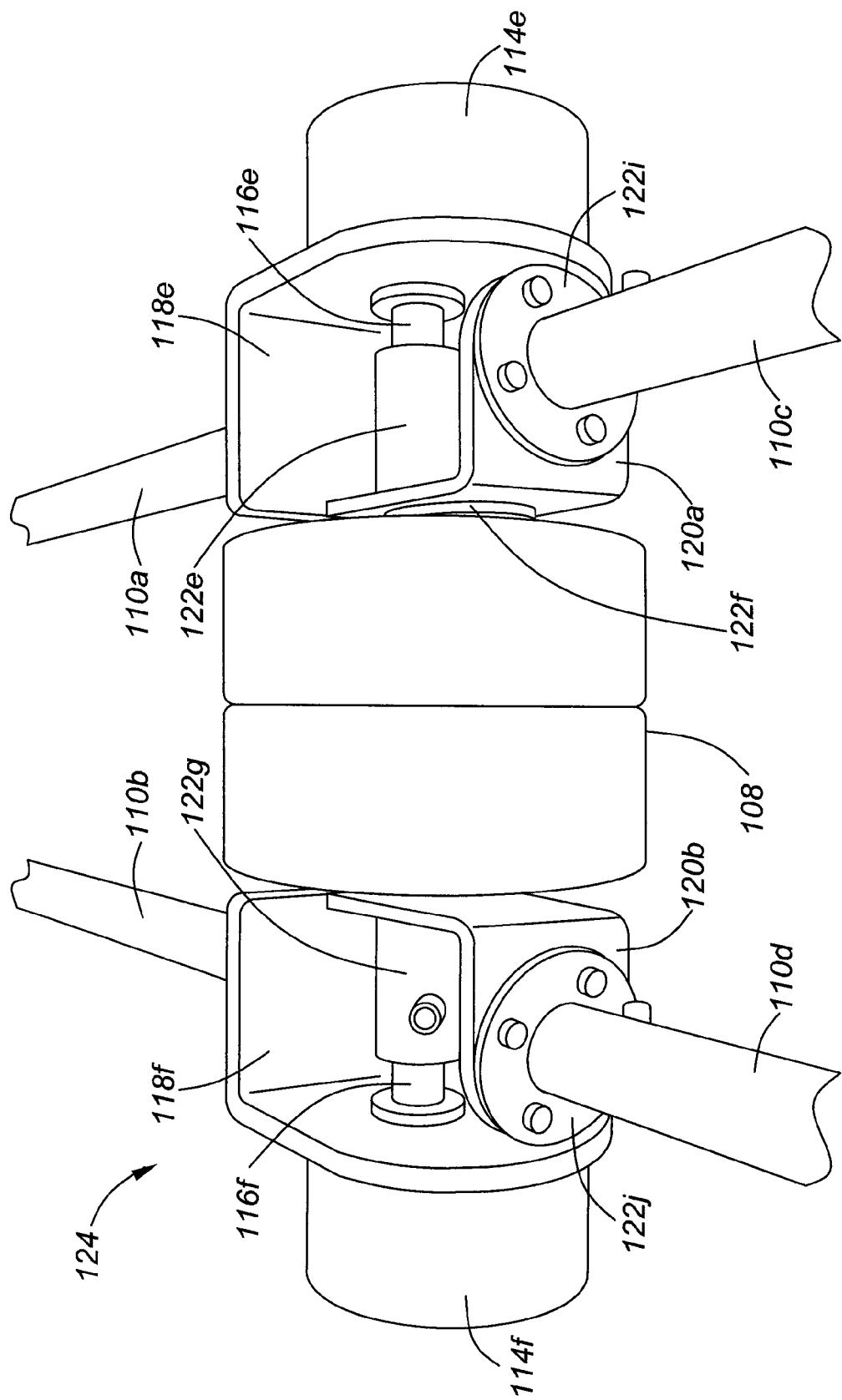
FIG. 5 is a perspective view of an actuatable hub of the adaptable vehicle of FIG. 1.
Figure 6:
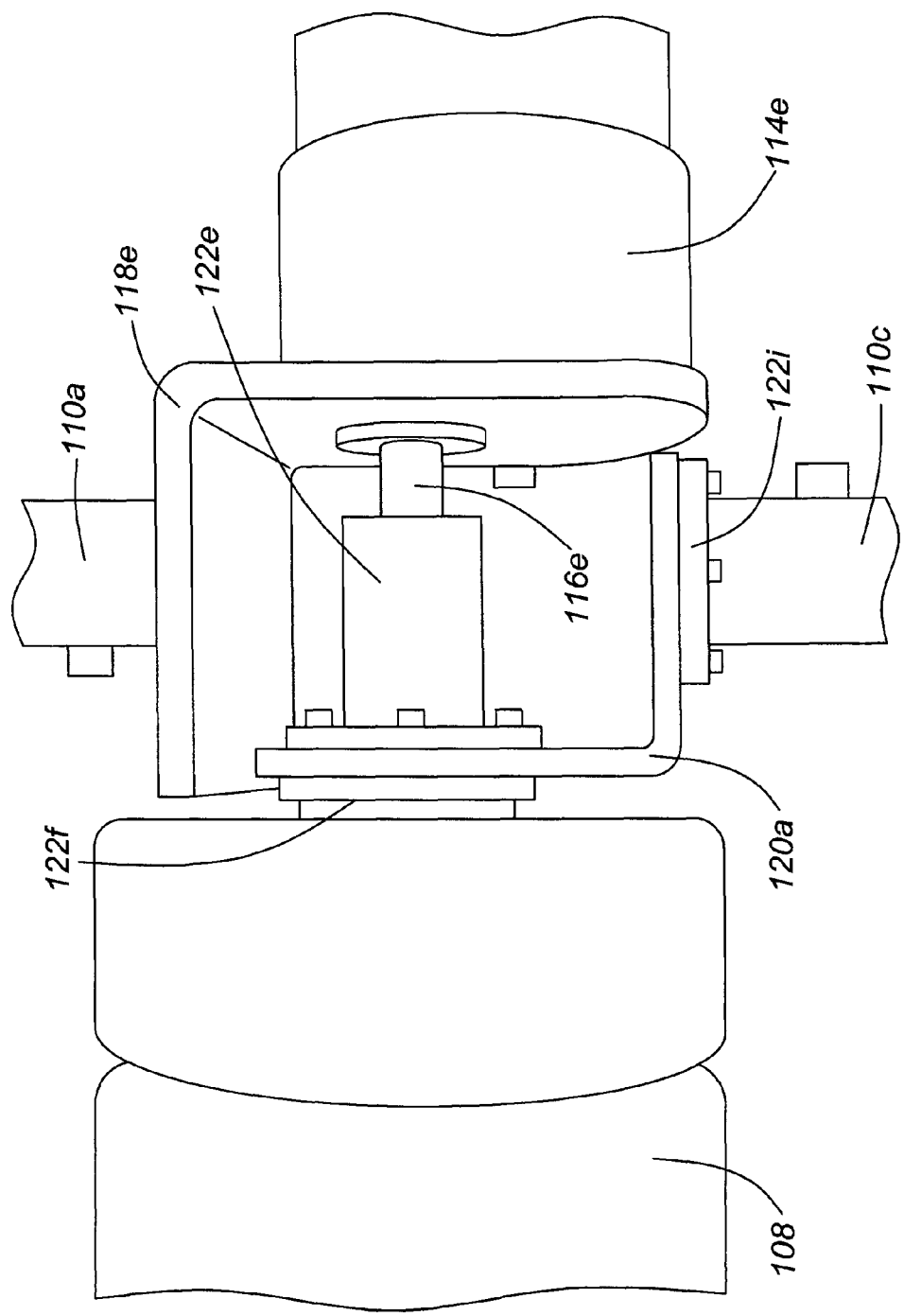
FIG. 6 is a top plan view of a portion of the actuatable hub of FIG. 5 at which two linking arms connect to the actuatable hub.

Coupling One of the Sets of Linking Arms 104b with One of the Primary Rollers 102b Referring now to FIG. 5, which depicts in detail the hub 124; FIG. 6, which depicts in detail the location at which the linking arms 110a,c attach to one end of the hub 124; and to FIG. 10, the hub 124 is composed of a variety of components. At the ends of the hub 124 are a pair of DC motors 114e,f that respectively have output shafts 116e,f. The output shaft 116e is inserted through one pair of connectors 122e,f, while the other output shaft 116f is inserted through another pair of connectors 122g,h. Each pair of connectors 122e,f and 122g,h are secured together such that rotation of one correspondingly results in rotation of the other; in the depicted embodiment, this is accomplished by screwing flanges on each of the connectors 122e,f together. The other connectors 122g,h are similarly fastened together. The connectors 122f,h are then inserted into, but not fixedly secured to, a hub roller 108. Consequently, rotation of the output shafts 116e,f does not result in rotation of the hub roller 108, and the DC motors 114e,f can be driven without rotating the hub roller 108. The hub roller 108 can therefore be described as unpowered.

Between the flanges of the pair of connectors 122e,f is secured a bracket 120a, and between the flanges of the other pair of connectors 122g,h is secured another bracket 120b. Powering the DC motors 114e,f therefore results in rotation of the brackets 120a,b about the hub 124. The brackets 120a,b are respectively coupled to the linking arms 110c,d using connectors 122i,j. The linking arm 110c is hollow, and a tubular portion of the connector 122i is inserted into the linking arm 110c, following which a flange on the connector 122i is screwed to the bracket 120a and the linking arm 110c is screwed to the connector 122i; the other linking arm 110d is similarly secured to the other bracket 120b using the other connector 122j. Using this structure, powering the DC motors 114e,f consequently results in rotation of the linking arms 110c,d relative to the hub 124 and changes $\phi$, as discussed in more detail below.

Figure 7:
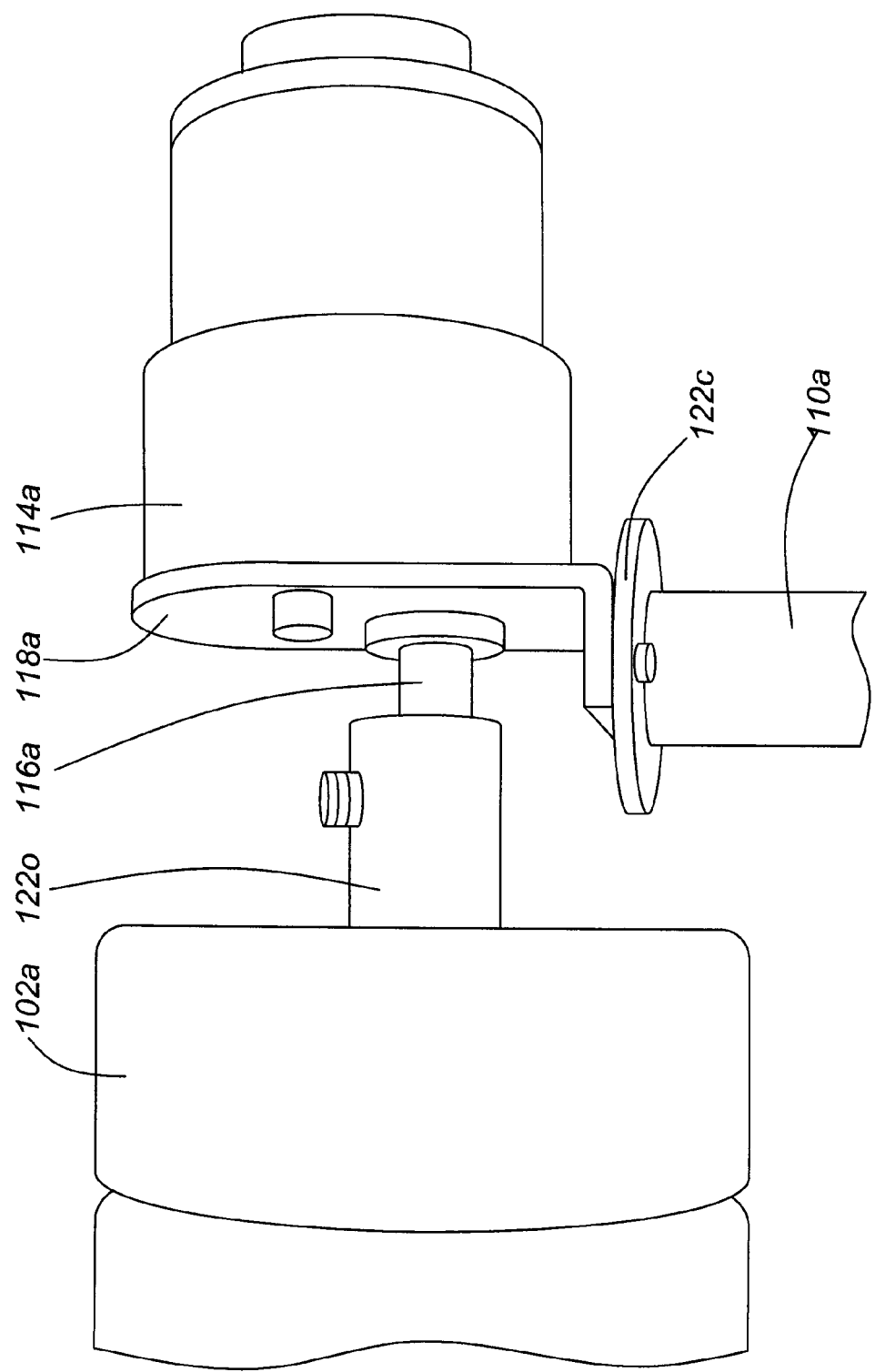
FIG. 7 is a top plan view of a portion of the adaptable vehicle of FIG. 1 at which one of the linking arms and one of the primary rollers of the adaptable vehicle are coupled together.

At the other end of the linking arms 110c,d is located one of the primary rollers 102b. FIG. 7 depicts in detail the coupling between one of the linking arms 110d to the primary roller 102b. The primary roller 102b is powered by a DC motor 114d. Attached to the casing of the DC motor 114d is a motor mount 118d. The motor mount 118d is secured to an end of the linking arm 110d using a connector 122d. A tubular portion of the connector 122d is inserted into and screwed to the linking arm 110d, while a flange on the connector 122d is placed against and screwed to the motor mount 118d; the motor mount 118d can swivel on the casing of the DC motor 114d. On the other side of the primary roller 102b is another DC motor 114c, motor mount 118c, and connector 122c; these are similarly secured to the other linking arm 110c.

The DC motor 114d has an output shaft 116d that is fixedly secured to the primary roller 102b; the output shaft 116d and the axis of rotation of the primary roller 102b are coaxial, as depicted by the dashed line in FIG. 1. The output shaft 116*d* is inserted into and screwed to the tubular interior of a connector 122*n*. The connector 122*n* has a flange that is screwed to the primary roller 102*b*. Consequently, activation of the DC motor 114*d* results in rotation of the primary roller 102*b*; in this sense the primary roller 102*b* is powered. On the other side of the primary roller 102*b* is another DC motor 114*c*, whose output shaft 116*c* is similarly secured to the primary roller 102*b* using another connector 122*m*. During operation of the adaptable vehicle 100 both of the DC motors 114*c,d* can be activated to cause the primary roller 102*b* to spin, consequently propelling the adaptable vehicle 100.

Coupling the Other of the Sets of Linking Arms 104*a* with the Other of the Primary Rollers 102*a*

Referring again to FIGS. 5, 6, and 10, the other primary roller 102*a* is connected using the other set of linking arms 104*a* to the hub 124. Referring now in particular to FIG. 6 and to the connection of one of the linking arms 110*a* to the hub 124, the hub 124 includes a motor mount 118*e* on to which the DC motor 114*e* is secured. The motor mount 118*e* and the linking arm 110*a* are secured together using a connector 122*a*; a tubular portion of the connector 122*a* is inserted into and screwed to the linking arm 110*a*, while a flange on the connector 122*a* is placed against and screwed to the motor mount 118*e*; the motor mount 118*e* can swivel on the casing of the DC motor 114*e*. On the other side of the hub 124, the other linking arm 110*b* is similarly connected to another motor mount 118*f* via another connector 122*b*.

The primary roller 102*a* has on one side of it one DC motor 114*a* with an output shaft 116*a* and on the other side of it another DC motor 114*b* with another output shaft 116*b*. The output shafts 116*a,b* are fixedly coupled to the primary roller 102*a* using connectors 122*o,p*, respectively, in a similar fashion as how the other primary roller 102*b* is connected to the output shafts 116*c,d* of its motors 114*c,d*; the output shafts 116*a,b* and the axes of rotation of the primary roller 102*a* are coaxial, as depicted by the dashed line in FIG. 1. Additionally, the linking arms 110*a,b* are secured to the primary roller 102 via motor mounts 118*a,b* and connectors 122*c,d*, respectively, just as the other pair of linking arms 110*c,d* are secured to the other primary roller 102 via the other motor mounts 118*c,d* and the connectors 122*k,l*. Consequently, activation of the DC motors 114*a,b* causes the primary roller 102*a* to spin, consequently propelling the adaptable vehicle 100.

An exemplary list of parts that can be used to manufacture the adaptable vehicle 100 follows:

| Component of Adaptable Vehicle | Exemplary Component |
| --- | --- |
| DC motors 114a-d | 4 × Lynxmotion ™ 7.2 VDC 291 RPM 54.31 oz-in GHM-03 Spur Gear Head Motor |
| DC motors 114e,f | 2 × Lynxmotion ™ 7.2 VDC 175 RPM 99.04 oz-in GHM-04 Spur Gear Head Motor |
| Primary rollers 102a,b | 4 × Lynxmotion ™ Ant/Beetle Robot Tire - 2.125"D × 0.8"W (2 for each of the primary rollers 102a,b) |
| Hub roller 108 | 1 × Lynxmotion ™ Sumo Tire - 2.50"D × 1.5"W |
| Linking arms 102a-d | 4 × Lynxmotion ™ Aluminum Tubing - 3" AT-02 |
| Connectors 122e-h, m-p | 8 × Lynxmotion ™ HUB-04 Universal Hub - 6 mm |
| Connectors 122a-d, i-l | 8 × Lynxmotion ™ Aluminum Tubing Connector Hub HUB-08 |
| Motor mounts 118e,f | 2 × Lynxmotion ™ MMT-03 Motor Mounts |
| Motor mounts 118a-d | 2 × Lynxmotion ™ MMT-03 Motor Mounts (suitably machined) |
| Brackets 120a,b | 2 × Lynxmotion ™ Aluminum "L" Connector Bracket (Brushed) ASB-06B |

Operating the Adaptable Vehicle 100

Figure 8:
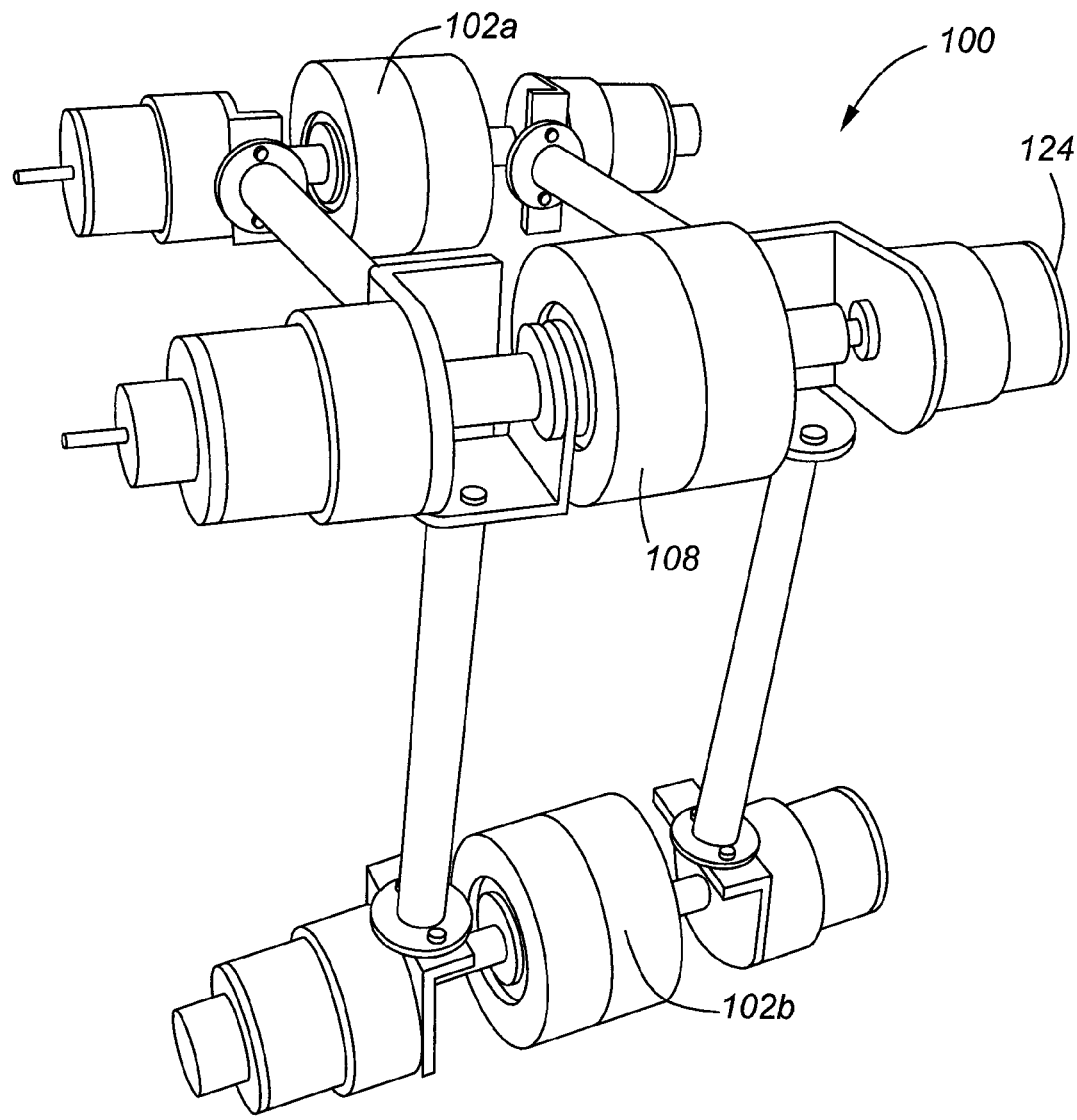
FIGS. 8 and 9 are perspective views of the adaptable vehicle of FIG. 1 with two sets of linking arms positioned at one angle relative to the actuatable hub (FIG. 8), and at another angle relative to the actuatable hub (FIG. 9).
Figure 9:
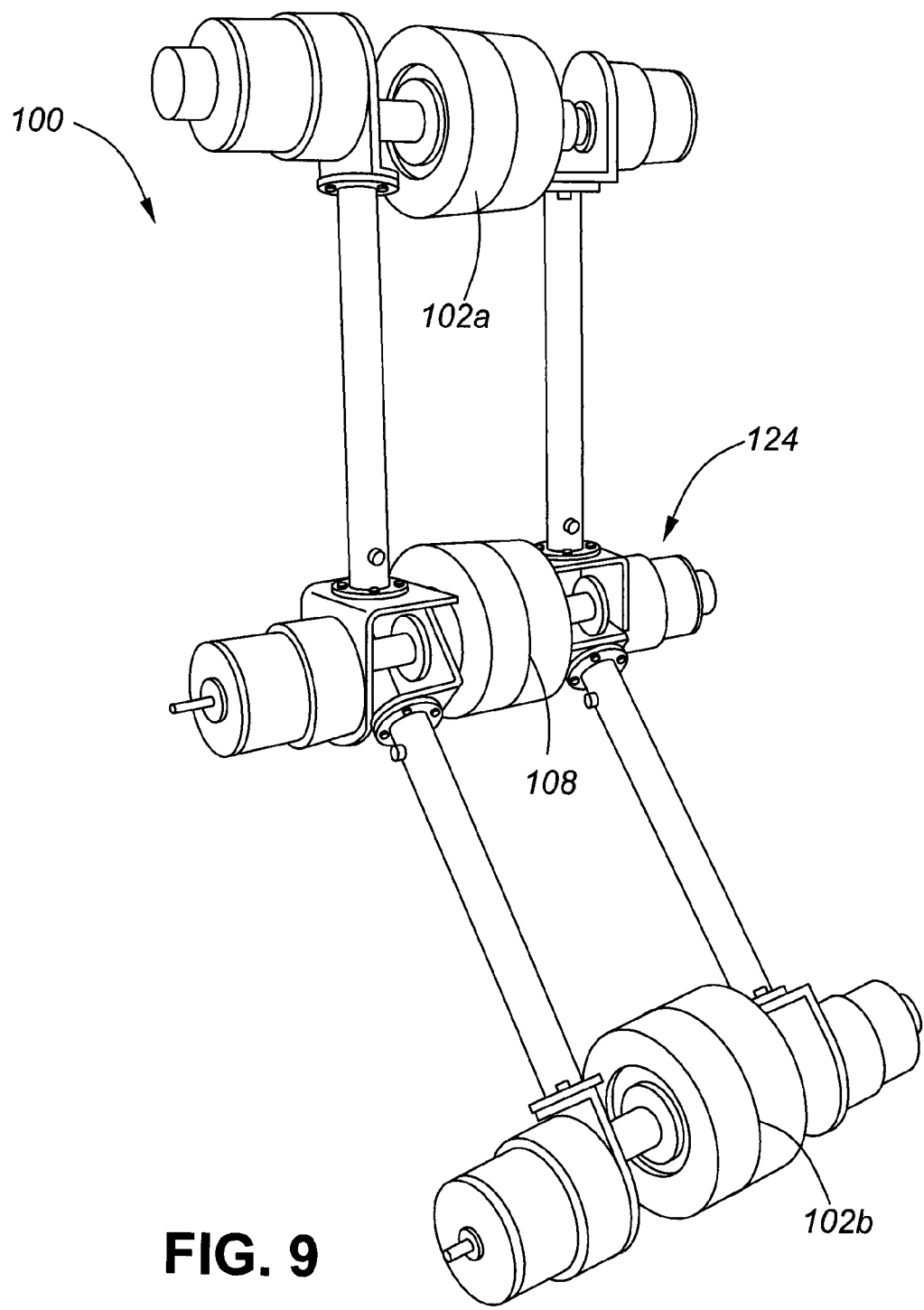

As illustrated in FIGS. 8 and 9, the hub 124 can be actuated such that φ is changed. By virtue of operating the DC motors 114*e,f*, which are located on either side of the hub roller 108, the hub 108 can be actuated in either a contracting or an expanding direction.

Operating the DC motors 114*e,f* are actuated in a direction such that φ increases is referred to as actuating the hub 124 in an "expanding" direction; in contrast, actuating the DC motors 114*e,f* such that φ decreases is referred to as actuating the hub 124 is a "contracting" direction. In order for the adaptable vehicle 100 to transition from its position in FIG. 8 to its position in FIG. 9, the hub 124 is actuated in the expanding direction.

Figure 12B:
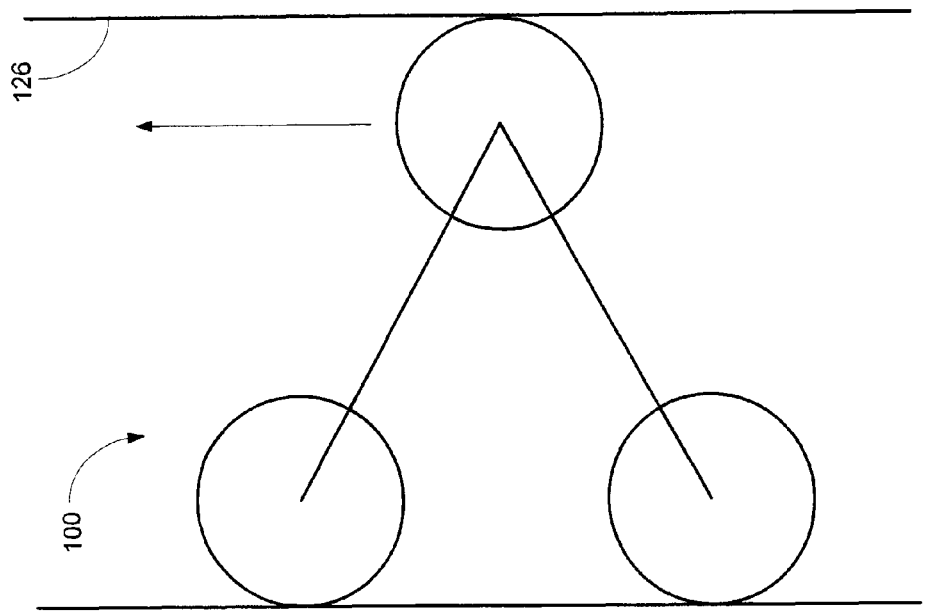
FIGS. 12(*a*) and (*b*) are examples of the adaptable vehicles of FIG. 1 being used to climb a pole and a duct, respectively.
Figure 12A:
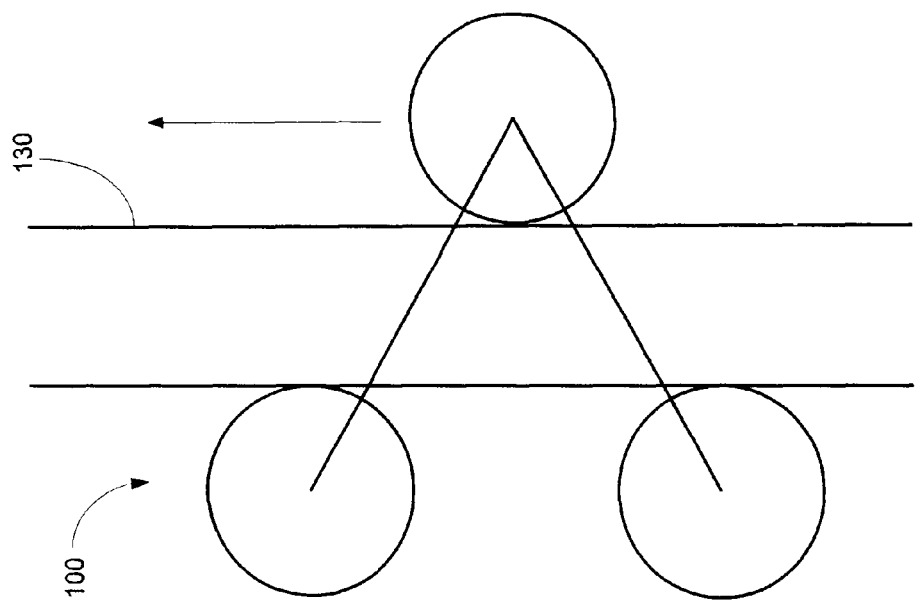

Referring now to FIG. 12(*a*), there is shown the adaptable vehicle 100 climbing a pole 130. The pole 130 passes in between the linking arms 110*a,b* that connect the hub 124 to one of the primary rollers 102*a* and between the linking arms 110*c,d* that connect the hub 124 to the other of the primary rollers 102*b*. In order for all three of the rollers 102*a,b* and 108 to contact the surface of the pole 130 at any given time, the adaptable vehicle 100 is designed so that the three rollers 102*a,b* and 108 are coplanar along a "roller plane" (not depicted), and so that the portion of the pole 130 along which the adaptable vehicle 100 rolls intersects the roller plane. To prevent itself from falling, the adaptable vehicle 100 has to generate enough frictional force between its rollers 102*a,b* and 108 and the surface of the pole 130 by sufficiently actuating the hub 124 to cause the rollers 102*a,b* and 108 to press against the pole 130, the general method for which is described below in respect of FIGS. 13(*a*) and (*b*). To increase frictional force between the rollers 102*a,b* and 108 and the pole 130, the hub 124 actuates in the contracting direction, and to decrease frictional force the hub 124 actuates in the expanding direction. Similarly, in FIG. 12(*b*), there is shown the adaptable vehicle 100 climbing the interior of a duct 126. As with climbing the pole 130, the adaptable vehicle 100 generates enough frictional force to be able to climb the duct 126. In contrast to the pole 130, the adaptable vehicle 100 increases frictional force between itself and the duct 126 by actuating the hub 124 in the expanding direction, and decreases frictional force by actuating the hub 124 in the contracting direction.

While travelling through or along objects such as the duct 126 and the pole 130, the object may change shape and the adaptable vehicle 100 may compensate as a result in order to maintain frictional forces within a predetermined range sufficient to prevent the vehicle 100 from falling; such a predetermined range may be, for example, between the minimum frictional force required to keep the adaptable vehicle 100 from falling and 10% above this minimum force. For example, when travelling along the pole 130, the pole 130 may suddenly decrease in diameter. An optical encoder (not shown) positioned on the adaptable vehicle 100 to measure φ can detect that φ has consequently increased notwithstanding no intended change in operation of the DC motors 114*e,f*, and conclude that this occurred because the pole 130 diameter has decreased (an exemplary optical encoder is a Lynxmotion™ quadrature motor encoder with cable). In response, the DC motors 114*e,f* can be instructed such that the hub 124 actuated in the expanding direction to restore the frictional force to the predetermined range. The hub 124 can analogously be actuated in the contracting direction if the pole 130's diameter expands or the duct 126's width contracts, and can be actuated in the expanding direction if the duct 126's width increases.

The adaptable vehicle 100 may also be outfitted with an accelerometer to detect if the adaptable vehicle 100 is, for whatever reason, falling. Upon detecting falling, the hub 124 may be actuated so as to immediately stop the falling by actuating as far as possible in either the contracting direction, if the object on which the adaptable vehicle 100 is travelling is between the rollers 102a,b and 108, or the expanding direction, if the object on which the adaptable vehicle 100 is travelling is around the adaptable vehicle 100. Simultaneous with this expansion or contraction, the DC motors 114a-d would also lock the primary rollers 102a,b in place by preventing them from spinning.

Figure 13A:
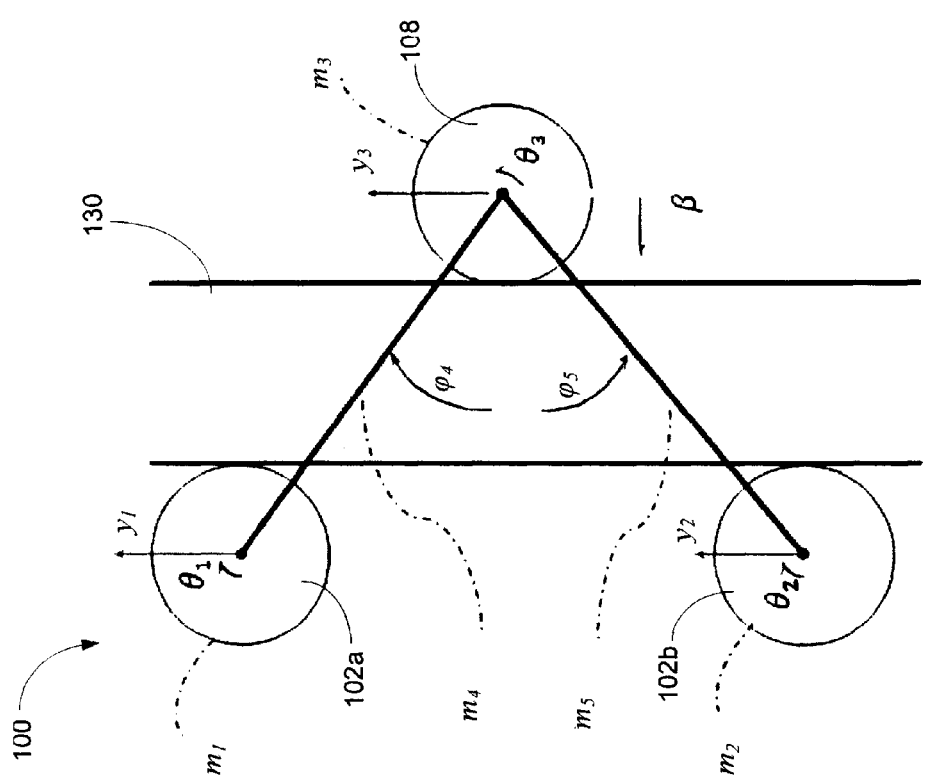
FIGS. 13(*a*) and 13(*b*) are a diagram of a coordinate system that can be used to describe the dynamics of the adaptable vehicle of FIG. 1 when the adaptable vehicle is mounted to a pole and a force diagram of the adaptable vehicle mounted to the pole, respectively.
Figure 13B:
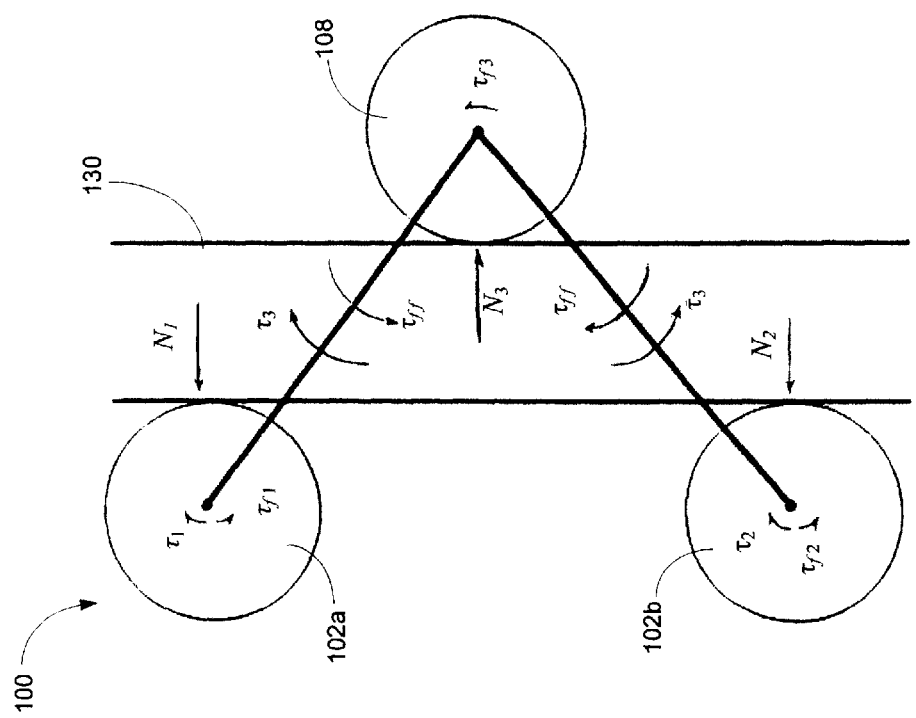

FIG. 13(a) depicts a coordinate system that can be used to describe the dynamics of the adaptable vehicle 100, while FIG. 13(b) is a force diagram of the adaptable vehicle 100 on the pole 130. Both FIGS. 13(a) and 13(b) are helpful for deriving how much torque can be applied to the primary rollers 102a,b to allow for acceleration up the pole 130 without slippage, and for deriving how much normal force to apply to the rollers 102a,b and 108 in order to prevent the adaptable vehicle 100 from falling down the pole 130. The following derivation uses the variables as defined in FIGS. 13(a) and 13(b) and are in the context of the adaptable vehicle climbing the pole 130.

In the depicted embodiment the adaptable vehicle 100 can be modelled as having two degrees of freedom. This is true in the ideal situation that assumes pure rolling (i.e.: no slippage) between the rollers 102a,b and the surface of the pole 130, and that assumes no lateral motion (motion along the arrow labelled (3 in FIG. 13(a)) of the center of gravity of the adaptable vehicle 100. The two degrees of freedom are rotational motion of the primary rollers 102a,b (denoted using $\theta$ in FIG. 13(a)), and rotational motion of the linking arms 110a-d (denoted using $\phi$ in FIG. 13(a)). These two variables are used as the generalized coordinates when deriving dynamics equations for the adaptable vehicle 100 using Lagrangian Mechanics.

With respect to FIG. 13(a), the following assumptions are made:

$$\begin{cases} m_2 = m_2 = m_{1,2} \\ m_4 = m_5 = m_{4,5} \\ r_1 = r_2 = r_3 = r \\ r_{S1} = r_{S2} = r_{S3} = r_3 \\ l_1 = l_2 = l \\ \varphi_4 = \varphi_5 = \varphi \\ \theta_1 = \theta_2 = \theta_3 = \theta \\ y_1 = y_2 = y_3 = y \end{cases}$$

where $m_i$=the mass of the $i^{th}$ pair of DC motors 114a-f and the roller 102a,b and 108 associated with that pair of motors 114a-f, or the mass of the $i^{th}$ set of linking arms 104a,b;

$r_i$=the radius of the $i^{th}$ roller 102a,b and 108;

$r_{si}$=the radius of the $i^{th}$ motors' 114a-f rotor; and $l_1, l_2$=the length of the linking arms 104a,b.

Mathematically, pure rolling is represented mathematically as follows:

$$y - r\theta = 0 \text{ (where } \theta \text{ is in radians)}$$

Assuming that the center of gravity of the adaptable vehicle 100 does not laterally move, lateral motion of the primary rollers 102a,b (labelled $\beta$ in FIG. 13(a)) is related to angular motion of the sets of linking arms 104a,b as follows:

$$\frac{\beta}{l(\cos\varphi_0 - \cos[(\varphi)]} = \frac{2m_{1,2} + m_{4,5}}{m_{total}}$$

where $m_{total}$ denotes the total mass of the adaptable vehicle 100. The position $(Y_i)$ and velocity $(V_i)$ of 1) the pair of primary rollers 102a,b and the motors 114a-d that power them; 2) the hub roller 108 and the motors 114e,f that rotate the sets of linking arms 104a,b; and 3) the sets of linking arms 104a,b can be calculated in terms of the two degrees of freedom $\theta$ and $\phi$ as follows:

$$Y_1 = r\theta + l(\sin\varphi - \sin\varphi_0)$$

$$Y_2 = r\theta - l(\sin\varphi - \sin\varphi_0)$$

$$Y_3 = y$$

$$Y_4 = r\theta + \frac{l}{2(\sin\varphi - \sin\varphi_0)}$$

$$Y_5 = r\theta - \frac{l}{2(\sin\varphi - \sin\varphi_0)}$$

$$V_1^2 = \dot{\varphi}^2 l^2 (\sin\varphi)^2 \left(\frac{\beta}{l(\cos\varphi_0 - \cos[(\varphi)]} - 1\right)^2 + \dot{\varphi}^2 l^2 (\cos\varphi)^2 + r^2 \dot{\theta}^2 + 2rl\dot{\theta}\dot{\varphi}\cos\varphi$$

$$V_2^2 = \dot{\varphi}^2 l^2 (\sin\varphi)^2 \left(\frac{\beta}{l(\cos\varphi_0 - \cos[(\varphi)]} - 1\right)^2 + \dot{\varphi}^2 l^2 (\cos\varphi)^2 + r^2 \dot{\theta}^2 - 2rl\dot{\theta}\dot{\varphi}\cos\varphi$$

$$V_3^2 = r^2 \dot{\theta}^2 + \dot{\varphi}^2 l^2 (\sin\varphi)^2 \left(\frac{\beta}{l(\cos\varphi_0 - \cos[(\varphi)]}\right)^2$$

$$V_4^2 = \dot{\varphi}^2 l^2 (\sin\varphi)^2 \left(\frac{\beta}{l(\cos\varphi_0 - \cos[(\varphi)]} - \frac{1}{2}\right)^2 + \dot{\varphi}^2 \frac{l^2}{4} (\cos\varphi)^2 + r^2 \dot{\theta}^2 + rl\dot{\theta}\dot{\varphi}\cos\varphi$$

$$V_5^2 = \dot{\varphi}^2 l^2 (\sin\varphi)^2 \left(\frac{\beta}{l(\cos\varphi_0 - \cos[(\varphi)]} - \frac{1}{2}\right)^2 + \dot{\varphi}^2 \frac{l^2}{4} (\cos\varphi)^2 + r^2 \dot{\theta}^2 - rl\dot{\theta}\dot{\varphi}\cos\varphi$$

where $\phi_0$ denotes the angle each of the linking arms 104a,b makes with an axis normal to the pole 130's surface when the rollers 102a,b and 108 just touch the pole 130's surface (i.e.: minimum angle at which the adaptable vehicle 100 will be suspended on the pole 130), and when $\phi > 0$ the amount of force applied to the surface of the pole 130 increases, and when $\phi < 0$ the amount of force applied to the surface of the pole 130 decreases.

The kinetic and potential energies of the adaptable vehicle 100 can be calculated in terms of $\theta$ and $\phi$ as:

$$T = \frac{1}{2} \sum (I_{i=1}^{5} \dot{\theta}^2 + I_2 \dot{\theta}^2 + I_3 \dot{\theta}^2 + I_4 \dot{\phi}^2 + I_5 \dot{\phi}^2 + m_1 V_1^2 + m_2 V_2^2 + m_3 V_3^2 + m_4 V_4^2 + m_5 V_5^2)$$

$$V = (Y_1)m_1 g + (Y_2)m_2 g + (Y_3)m_3 g + (Y_4)m_4 g + (Y_5)m_5$$

where $I_n$ denotes moments of inertia of the various moving parts of the adaptable vehicle 100.

Referring now to FIG. 13(b), there is shown a force diagram of the adaptable vehicle 100 as it is travelling upwards along the pole 130. The notations used in FIG. 13(b) include:

$\tau_i$=the torque applied by the $i^{th}$ pair of DC motors 114a-f;

$N_i$=the normal force from the pole 130's surface exerted on the $i^{th}$ pair of rollers 102a,b and 108;

$\tau_{fi}$=the resisting torque due to rolling friction between the pole 130's surface and the $i^{th}$ pair of rollers 102a,b and 108; and $\tau_{ff}$=the resisting torque due to sliding friction between the axle of the hub roller 108 and its bearing.

$$\begin{cases} \dot{Q}_\theta = \tau_1 + \tau_2 - (\tau_{f1} + \tau_{f2} + \tau_{f3})\text{sign}(\dot{\theta}) \\ \dot{Q}_\varphi = \tau_3 - \tau_{ff}\text{sign}(\dot{\varphi}) \end{cases} \quad (1)$$

where sign( ) refers to the signum function;

$\dot{Q}_\theta$=non-potential portion of the generalized forces causing change in $\theta$; and $\dot{Q}$=non-potential portion of the generalized forces causing change in $\phi$.

Additionally:

$$\begin{cases} \tau_i = 2kt_i A_i \\ \tau_{fi} = \mu_r N_i r \\ \tau_{ff} = \mu_{rs} N_3 r_a \end{cases} \quad (2)$$

$A_i$=current drawn by the $i^{th}$ pair of DC motors 114a-f, in Amps;

$Kt_i$=torque constant of the $i^{th}$ pair of DC motors 114a-f;

$\mu_{rs}$=sliding friction coefficient between the hub roller 108's axle and its bearing;

$\mu_r$=rolling friction coefficient between the rollers 102a,b and 108 and the pole 130's surface; and $r_a$=radius of the hub roller 108's axle.

Assuming the torque constants of the DC motors 114a-d are equal, $K_{t1}=K_{t2}=K_t$. Assuming that the pole 130 has a flat surface, the overall torques generated by the pairs of DC motors 114a-d for the primary rollers 102a,b are $\tau_1=\tau_2=2 K_t A_{1,2}$. The overall torque generated by the motors 114e,f adjacent to the hub roller 108 is $\tau_3=2 K_{t3} A_3$. The torque constants of the motors 114a-f are normally specified by the manufacturer.

Assuming that the center of gravity of the adaptable vehicle 100 does not move laterally:

$$N_1 + N_2 = N_3 \text{ and } N_1 = N_2. \quad (3)$$

Then:

$$\begin{cases} N_3 = N \\ N_1 = N_2 = \dfrac{N}{2} \end{cases} \quad (4)$$

and, from the above equations:

$$\begin{cases} \dot{Q}_\theta = 4kt_{1,2} A_{1,2} - 2\mu_r N r \text{sign}(\dot{\theta}) \\ \dot{Q}_\varphi = 2kt_3 A_3 - \mu_{rs} N r_a \text{sign}(\dot{\varphi}) \end{cases} \quad (5)$$

The generalized forces shown in FIG. 13(*b*) can be related to the generalized coordinates shown in FIG. 13(*a*) through the Lagrange formulae:

$$\begin{cases} \dfrac{d}{dt}\left(\dfrac{\partial T}{\partial \dot{\theta}} - \dfrac{\partial V}{\partial \dot{\theta}}\right) - \left(\dfrac{\partial T}{\partial \theta} - \dfrac{\partial V}{\partial \theta}\right) = \dot{Q}_\theta \\ \dfrac{d}{dt}\left(\dfrac{\partial T}{\partial \dot{\varphi}} - \dfrac{\partial V}{\partial \dot{\varphi}}\right) - \left(\dfrac{\partial T}{\partial \varphi} - \dfrac{\partial V}{\partial \varphi}\right) = \dot{Q}_\varphi \end{cases} \quad (6)$$

This results in the following set of differential equations:

$$B_1 \ddot{\theta} + B_2 gr = 4kt_{1,2} A_{1,2} - 2\mu_r N r \text{sign}(\dot{\theta})$$

$$2\ddot{\varphi} B_3 = 2kt_3 A_3 - \mu_{rs} N r_a \text{sign}(\dot{\varphi}) \quad (7)$$

where, $$B_1 = I_3 + 2I_{1,2} + 2m_{1,2} r^2 + 2m_{4,5} r^2 + m_3 r^3$$

$$B_2 = 2m_{1,2} + m_3 + 2m_{4,5}$$

$$B_3 = m_{1,2} l^2 + \frac{7 m_{4,5} l^2}{12} +$$

$$\left(\begin{array}{c} \sin\varphi^2 - \\ 2\sin\varphi\cos\varphi \end{array}\right) \cdots \left(\frac{l^2 m_{1,2}(2m_{1,2} + m_{4,5})^2}{m_{total}^2} - \frac{2l^2 m_{1,2}(2m_{1,2} + m_{4,5})}{m_{total}} + \right.$$

$$\frac{l^2 m_3 (2m_{1,2} + m_{4,5})^2}{2 m_{total}^2} + \frac{l^2 m_{4,5}(2m_{1,2} + m_{4,5})^2}{m_{total}^2} -$$

$$\left.\frac{l^2 m_{4,5}(2m_{1,2} + m_{4,5})}{m_{total}}\right)$$

The normal force, N, is used in Equation (7). This normal force can be calculated by taking the stiffness and damping between the rollers 102a,b and 108 and the pole 130's surface into account. The normal force can be then related to the mass and also the angular position of the linking arms 104a,b as follows:

$$N = \frac{l(k\cos\varphi_0 - k\cos\varphi + b\dot{\varphi}\sin\varphi)(2m_{1,2} + m_{4,5})}{m_{total}} \quad (8)$$

In Equation (8), K and b are the stiffness and damping coefficients, respectively. The numerical values for the motors' 114a-f parameters are available from the motors' 114a-f manufacturer, while mechanical properties such as mass moment of inertias can be directly measured.

From the foregoing equations, the amount of current $A_i$ for each of the three pairs of motors 114a-f can be determined over a range of operating conditions.

Figure 11:
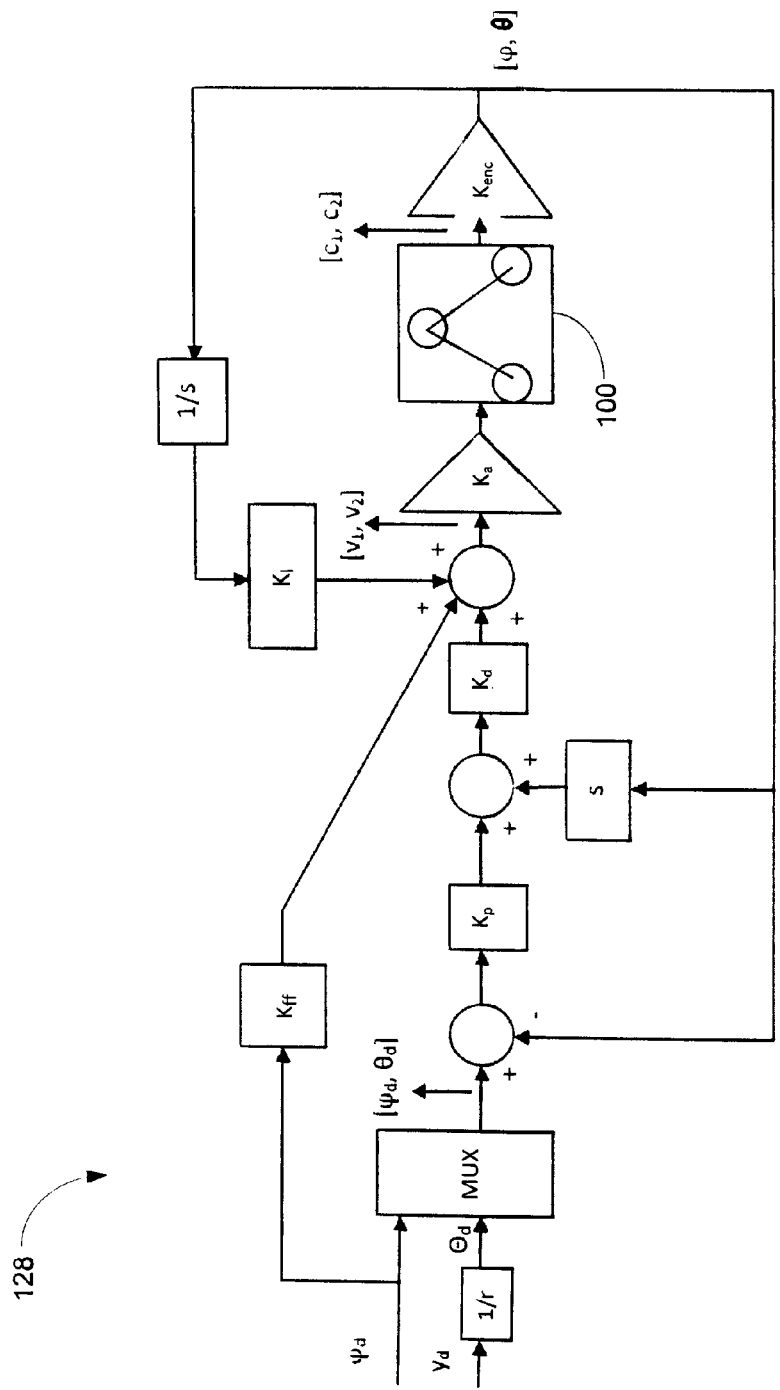
FIG. 11 is a block diagram of a control system that can be used to control the adaptable vehicle of FIG. 1.

FIG. 11 is a block diagram of an exemplary control system 128 that includes both PID control and a feed-forward gravity compensator, which can be used to control the adaptable vehicle 100. When the control system 128 utilizes feedback, the adaptable vehicle 100 may be outfitted with the optical encoders (not shown) that can be used to determine the angular position of the rollers 102a,b and 108. The following table provides exemplary values for the parameters used in the control system 128 of FIG. 11, when the control system 128 controls the adaptable vehicle 100 as it travels up the pole 130.

| Parameter | Value |
|---|---|
| $K_P$ (PID controller gain) | 0.7 volts/rad |
| $K_I$ (PID controller gain) | 2.0 Volts/rad·sec |
| $K_d$ (PID controller gain) | 0.55 Volts·sec/rad |
| $K_{FF}$ (feedforward controller gain) | 1.1 Volts/rad |
| $[v_1, v_2]$ (input voltage applied to the motors 114a-f; $v_1$ refers to the voltage applied to the motors 114a-d, while $v_2$ refers to the voltage applied to the remaining motors 114e, f) | $0 \leq (v_{1,2}) \leq 7.2$ Volts (nominal voltage is 7.2 Volts) |
| $[\phi_d, \theta_d]$ (desired linking arm 104a, b and roller 102a, b and 108 angles) | $[\phi_d, \theta_d]$ can both be set as desired by the user of the adaptable vehicle 100 within practical limits depending on operating conditions. For example, $\theta_d$ is limited by motor output and may be set so as to avoid roller slippage. $\phi_d$ is set such that the normal force is sufficient to support the adaptable vehicle 100's weight on the pole 130. |
| $[\phi, \theta]$ (actual linking arm 104a, b and roller 102a, b and 108 angles as measured using optical encoders) | While the adaptable vehicle 100 is moving $\theta$ changes constantly. Exemplary suitable values for $\phi$ are $42° \leq \phi \leq 50°$ |
| r (radius of the rollers 102a, b and 108) | 2.54 mm |
| $K_a$ (servo amplifier gain) | 2.0 Volts/Volts |
| $K_{enc}$ (optical encoders' calibration constant) | 0.9 degrees/count |
| $[c_1, c_2]$ (optical encoders' clicks) | $c_1 = c_2 = 400$ counts per revolution |

The control system 128 may, for example, include a Q4 H.I.L. board from Quanser™ and a terminal board. Software used to control the adaptable vehicle 100 can include, for example, Matlab™/Simulink™ from Mathworks™ and real-time Quarc™ control software by Quanser™. A joystick can be used as the human-machine interface. A PS2X3W24 power supply and two brush-type 12A8 linear servo amplifiers from Advanced Motion™ can be used to drive the motors.

The control system 128 may also be configured to implement the various exemplary methods regarding stopping in response to fall detection and responding to changes in the shape of an object it is scaling, such as the pipe 124 or the duct 126, as described above. The control system 128 may control the adaptable vehicle 100 using either wireless or wired technology.

In alternative embodiments (not depicted), the exemplary adaptable vehicle 100 described and depicted above may be modified in a variety of ways. For example, the adaptable vehicle 100 may incorporate irreversible gear trains on the DC motors 114e,f used to actuate the hub 124 to alleviate torque strain on the DC motors 114e,f; torsion springs may be added at connection points between the linking arms 110a-d to assist the DC motors 114e,f in handling strain caused by torque; electromagnetic breaks may be added for use in implementing emergency stop after a fall is detected; the DC motors 114a-f may be made watertight for underwater applications; the rollers 102a,b and 108 may be coupled to the remainder of the adaptable vehicle 100 with flexible joints so as to help the vehicle 100 conform to contoured objects, such as bending pipes, and so as to help prevent the vehicle 100 from ascending a rope or pole in an undesirable spiral path; and inertial sensors may be added to the adaptable vehicle 100 to help detect freefall. Additionally, although the depicted adaptable vehicle 100 utilizes three rollers 102a,b and 108, in alternative embodiments more than three rollers may be used, or, if the vehicle 100 is not designed to climb, only the primary rollers 102a,b can be used. Any additional rollers can be used to lengthen the adaptable vehicle 100, to widen the adaptable vehicle 100, or both.

Furthermore, although the rollers 102a,b and 108 of the depicted adaptable vehicle 100 are coplanar, any rollers used in alternative embodiments (not depicted) may not be coplanar. For example, the rollers used in an alternative embodiment may be spaced in both length and width so as to lower the likelihood that the adaptable vehicle 100 will flip when performing sharp turns.

The foregoing exemplary methods used to control the adaptable vehicle 100 may be stored on any suitable type of computer readable medium, such as but not limited to a CD-ROM, DVD, magnetic disk storage product, flash media, and any suitable type of volatile or non-volatile RAM (e.g.: SDRAM) or ROM (e.g.: EEPROM).

The control system 128 and any of the methods described above may be implemented using any suitable type of controller, such as a dedicated PID and feed-forward controller; an application-specific integrated circuit; a field programmable gate array; standard integrated circuits; any one or more microprocessors or microcontrollers; as firmware; or on any suitable combination thereof or any other suitable controller.

Further, in the foregoing exemplary methods, the various acts may be performed in a different order than described, some acts may be omitted entirely, and some acts may be added to the methods.

Any part of any aspect, embodiment, or method discussed in this specification can be implemented or combined with any other embodiment, aspect, or method.

For the sake of convenience, the embodiments above are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. An adaptable vehicle for climbing an object, the vehicle comprising:
   (a) a pair of primary rollers positioned to roll along a surface of one portion of the object, wherein at least one of the rollers is rotatably powered;
   (b) an actuatable hub comprising a hub roller positioned to roll along a surface of another portion of the object, wherein the hub is actuatable in expanding and contracting directions; and
   (c) two sets of linking arms each rotatably coupling one of the primary rollers to the hub such that actuation of the hub in the expanding direction causes the primary and hub rollers to press against the object when the object is around the vehicle, and actuation of the hub in the contracting direction causes the primary and hub rollers to clamp the object when the object is located between the primary and hub rollers.

2. A vehicle as claimed in claim 1 wherein each of the sets of linking arms comprises a pair of linking arms between which the object passes as the vehicle is climbing when the object is located between the primary and hub rollers, and the primary and hub rollers are coplanar along a roller plane that passes between the pairs of linking arms and that intersects the object.

3. A vehicle as claimed in claim 1 wherein the hub rollers and the sets of linking arms rotate about a common axis of rotation.

4. A vehicle as claimed in claim 1 wherein the hub roller is unpowered.

5. A vehicle as claimed in claim 1 wherein the rotation of the sets of linking arms about the hub and of any of the rollers that are powered is driven by a DC motor having an output shaft coaxial with the axis about which the rotation occurs.

6. A vehicle as claimed in claim 1 further comprising a roller optical encoder positioned to measure the angular position of one of the primary rollers and wherein the hub further comprises a hub optical encoder positioned to measure the angular position of the sets of linking arms.

7. A vehicle as claimed in claim 1 wherein both of the primary rollers are rotatably powered.

8. A method for climbing an object using a vehicle as claimed in claim 1, the method comprising:
   (a) actuating the hub such that frictional force between the primary and hub rollers press and the object is within a predetermined range sufficient to prevent the vehicle from falling; and
   (b) powering the primary roller that is rotatably powered to propel the vehicle along the object.

9. A method as claimed in claim 8 further comprising:
   (a) detecting a change in the shape of the object; and
   (b) accordingly actuating the hub such that the frictional force between the primary and hub rollers and the object is maintained within a predetermined range sufficient to prevent the vehicle from falling.

10. A method as claimed in claim 8 further comprising:
    (a) detecting when the vehicle falls; and
    (b) when the vehicle falls, actuating the hub such that sufficient frictional force results between the primary and hub rollers and the object to stop the vehicle from falling and locking the primary rollers in place.

11. A computer readable medium having encoded thereon statements and instructions to cause a controller to control an adaptable vehicle according to a method as claimed in claim 8.

* * * * *